(12) United States Patent
Qiu

(10) Patent No.: US 8,423,069 B2
(45) Date of Patent: *Apr. 16, 2013

(54) CELL ACCESS CONTROL METHOD AND USER EQUIPMENT

(75) Inventor: Yong Qiu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/527,382

(22) Filed: Jun. 19, 2012

(65) Prior Publication Data

US 2012/0258757 A1  Oct. 11, 2012

Related U.S. Application Data

(63) Continuation of application No. 12/642,097, filed on Dec. 18, 2009, now Pat. No. 8,224,321, which is a continuation of application No. PCT/CN2008/071338, filed on Jun. 17, 2008.

(30) Foreign Application Priority Data

Jun. 18, 2007 (CN) .......................... 2007 1 0111961

(51) Int. Cl.
 *H04B 7/00* (2006.01)
(52) U.S. Cl.
 USPC ........................................................ 455/517
(58) Field of Classification Search .................. 455/425, 455/434, 436, 433, 435.2, 422.1, 456.1–456.5, 455/453, 522, 450, 555, 417, 432.2, 445, 455/406, 465, 462, 464, 414; 370/331, 332, 370/262, 401, 352, 353, 356, 229, 355, 465, 370/230, 252, 259, 270, 285, 402, 494, 392, 370/389, 411, 437, 466
See application file for complete search history.

(56) References Cited

U.S. PATENT DOCUMENTS 6,334,052 B1  12/2001  Nordstrand
6,631,269 B1  10/2003  Cave
(Continued)

FOREIGN PATENT DOCUMENTS

CN  1255275 A  5/2000
CN  1602110 A  3/2005
(Continued)

OTHER PUBLICATIONS

"3rd Generation Partnership Project; Technical Specification Group Radio Access Network; Physical Channels and Modulation (Release 8)" 3GPP TS 36.211, Technical Specification, V1.1.0, May 2007, pp. 1-34.

(Continued)

*Primary Examiner* — Melody Mehrpour
(74) *Attorney, Agent, or Firm* — Slater & Matsil, L.L.P.

(57) ABSTRACT

A cell access control method and a user terminal are provided, the method includes: obtaining, by a user equipment (UE), cell access information through a pilot channel and/or a synchronization channel; determining a current cell is a macro base station cell or an HNB cell according to the cell access information; determining, when the current cell is an HNB cell, whether the UE is allowed to access the HNB cell according to HNB information of the cell access information, if the UE is allowed to access the HNB cell, performing the access processing, if the UE is not allowed to access the HNB, abandoning the access. A UE is provided accordingly.

8 Claims, 5 Drawing Sheets

U.S. PATENT DOCUMENTS

| | | |
|---|---|---|
| 6,704,569 B2 | 3/2004 | Larson |
| 6,728,226 B1 | 4/2004 | Naito |
| 6,751,207 B1 | 6/2004 | Lee et al. |
| 6,785,287 B1 | 8/2004 | Honkala et al. |
| 6,795,444 B1 | 9/2004 | Vo et al. |
| 6,799,041 B1 | 9/2004 | Dressel et al. |
| 6,807,422 B1 | 10/2004 | Ekman |
| 8,150,922 B2 | 4/2012 | Griffin et al. |
| 2004/0185880 A1 | 9/2004 | Ham et al. |
| 2005/0059390 A1 | 3/2005 | Sayers et al. |
| 2005/0078618 A1 | 4/2005 | Woo et al. |
| 2007/0037550 A1 | 2/2007 | Rassam |
| 2007/0042775 A1 | 2/2007 | Umatt et al. |
| 2007/0042799 A1 | 2/2007 | Jubin et al. |
| 2008/0220778 A1 | 9/2008 | Ekstedt et al. |
| 2010/0093345 A1 | 4/2010 | Verhoef et al. |
| 2012/0177012 A1* | 7/2012 | Buckley et al. ............... 370/335 |

FOREIGN PATENT DOCUMENTS

| | | |
|---|---|---|
| CN | 101272298 A | 9/2008 |
| CN | 101272603 A | 9/2008 |
| WO | WO 98/39940 A2 | 9/1998 |
| WO | WO 98/56207 A1 | 12/1998 |
| WO | WO 2006/068023 A1 | 6/2006 |

OTHER PUBLICATIONS

International Search Report issued in corresponding PCT Application No. PCT/CN2008/071338, issued Sep. 25, 2008.

Office Action issued on corresponding Chinese Patent Application No. 200710111961.X, issued Jan. 8, 2010.

Written Opinion issued in corresponding PCT Application No. PCT/CN2008/070962, mailed Aug. 21, 2008.

Supplemental European Search Report issued in corresponding European Patent Application No. 08 75 7749, dated Jul. 27, 2010.

Second Chinese Office Action, Application No. 200710111961.X, Dec. 31, 2011, 7 pages.

Third Chinese Office Action, Chinese Application No. 200710111961.X, mailing date: Apr. 28, 2012, 7 pages.

"Communication Pursuant to Article 94(3) EPC," Application No. 08757749.0, Applicant: Huawei Technologies Co., Ltd., mailing date: Jun. 15, 2012, 6 pages.

Houzé, "Common Pilot Channel for Network Selection," IEEE Vehicular Technology Conference, May 8, 2006, pp. 67-71.

* cited by examiner

CELL ACCESS CONTROL METHOD AND USER EQUIPMENT

This application is a continuation of U.S. patent application Ser. No. 12/642,097, filed on Dec. 18, 2009, which is a continuation of International Application No. PCT/CN2008/071338, filed on Jun. 17, 2008. The International Application claims priority to Chinese Patent Application No. 200710111961.X, filed on Jun. 18, 2007, each of which is incorporated herein by reference in its entirety.

TECHNICAL FIELD

The present disclosure relates to the communication field, and more particularly to a cell access control method and user equipment.

BACKGROUND

In a mobile communication system, in addition to macro base stations deployed by operators, another kind of base stations, i.e., femtocell or Home eNodeBs (HNB), also exist, which are called access points (APs). In the present disclosure, they are all called HNBs. Such HNB is characterized in a small coverage range and flexible installment.

Due to the coexistence of macro base stations and HNBs, when an HNB and a macro base station are adjacent to or overlap each other, it is necessary to avoid users that belong to the HNB from accessing the HNB. Accessing the HNB means that idle users are forbidden from residing in the HNB after cell selection and active users are forbidden from handing over to the HNB, and in the meantime, the users that belong to the HNB are allowed to access the HNB.

A cell access control method in the prior art is described as follows.

An idle user equipment (UE) is required to select a cell and then reside in the cell. After that, the UE determines whether the UE is allowed to access the HNB that provides services for the cell by reading a system broadcast message of the cell. If the UE is allowed to access the HNB, the UE then performs cell reselection.

An active UE measures all HNBs around and adjacent to the active UE before handover from a macro base station to an HNB, selects measurement reports of HNBs that allow to be accessed, and reports a measurement result, including surrounding macro base stations and HNBs that allow to be accessed, to a source macro base station. The source macro base station then performs a handover determination.

During implementation of the present disclosure, the inventors find that, in the prior art, an idle UE cannot determine whether the UE is allowed to access a current HNB until the UE resides therein, and as a result, the time of cell reselection is delayed.

Furthermore, an active UE is required to measure all HNBs around and adjacent to the UE. This results in increase of calculation amount and system burden.

SUMMARY OF THE INVENTION

The embodiments of the present disclosure are directed to provide a cell access control method and a UE, which are capable of reducing system burden and enhancing system performance.

The cell access control method provided in the embodiments of the present disclosure includes: obtaining, by a UE, cell access information through a pilot channel or a synchronization channel; determining whether the current cell is a macro base station cell or an HNB cell according to the cell access information.

The cell access control method provided in the embodiments of the present disclosure includes: obtaining, by a UE, cell access information through a system broadcast message or a measurement control message; determining whether the current cell is a macro base station cell or an HNB cell according to the cell identifier in cell access information.

The UE provided in the embodiments of the present disclosure includes: an obtaining unit, adapted to obtain cell access information through a pilot channel or a synchronization channel; a cell attribute determining unit, adapted to inform an access determining unit when it is determined that the current cell is an HNB cell according to the cell access information; an access determining unit, adapted to determine whether a UE is allowed to access the HNB cell according to the HNB information in the cell access information, and inform the access processing unit of a determining result; and an access processing unit, adapted to implement access processing when it is determined that the UE is allowed to access the current HNB cell, and abandoning the access when it is determined that the UE is not allowed to access the current HNB cell.

According to the preceding technical solutions, the embodiments of the present disclosure have the following advantages.

In the embodiments of the present disclosure, the cell access information is obtained through a pilot channel or a synchronization channel. If an adjacent cell is determined as a HNB cell, before implementing access processing, a UE determines whether the UE is allowed to access the HNB cell according to the cell access information; and the UE does not implement access processing if the UE is not allowed to access the HNB. Therefore, it is unnecessary to implement access processing for all adjacent cells, thereby reducing system burden and enhancing system performance.

BRIEF DESCRIPTION OF THE DRAWINGS

The present disclosure is more understood from the detailed description given herein below for only illustration by referring to the following accompanying drawings.

DETAILED DESCRIPTION OF ILLUSTRATIVE EMBODIMENTS

The embodiments of the present disclosure provide a cell access control method and a UE to enhance system performance.

Figure 1:
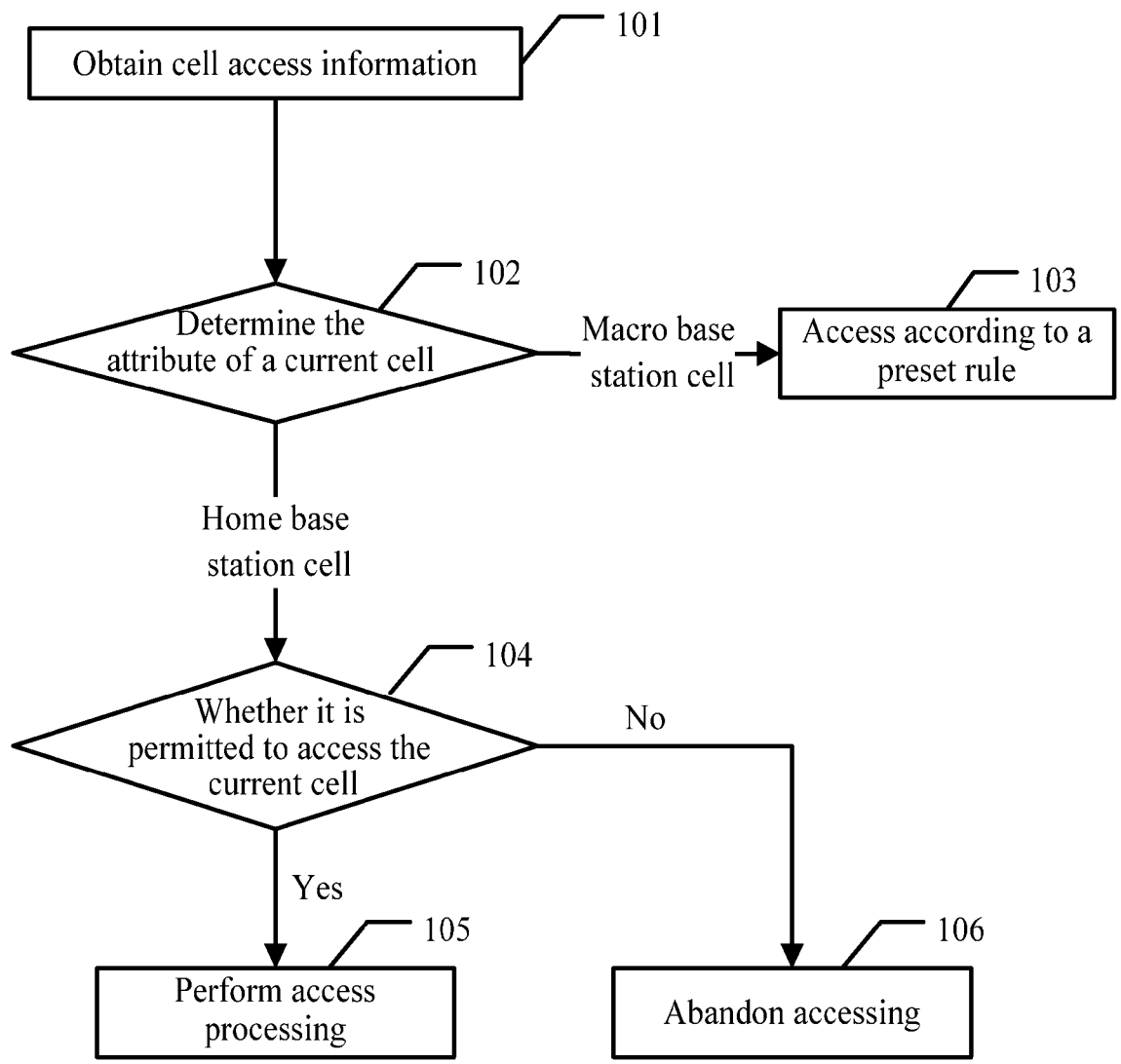
FIG. 1 is a flow chart of a cell access control method according to embodiments of the present disclosure.

With reference to FIG. 1, the overall process of the cell access control method in the embodiments of the present disclosure includes the following steps.

In step 101, cell access information is obtained.

The UE obtains the cell access information. The cell access information may be obtained through various manners, which is described in detail in the following embodiments.

In step 102, an attribute of a current cell is determined. If the current cell is a macro base station cell, step 103 is performed, and if the current cell is an HNB cell, step 104 is performed.

The UE determines the attribute of the current cell according to the cell access information. The specific method of determination is described in detail in the following embodiments.

In step 103, access is performed according to a preset rule.

If the current cell is a macro base station cell, an attempt to access is made according to the preset accessing rule. The specific rule and accessing method are of the prior art and are not defined here.

In step 104, it is determined that whether the UE is allowed to access the current cell. If the UE is allowed to access the current cell, step 105 is performed, and if the UE is not allowed to access the current cell, step 106 is performed.

If the current cell is an HNB cell, it is judged whether the UE is allowed to access the cell according to HNB information in the cell access information, and the specific method of determination is described in detail in the following embodiments.

In step 105, an access processing is implemented.

The specific access processing method is classified into the following two situations according to the state of the UE.

If the UE is ACTIVE, the cell is measured, and a measurement result is reported to a source base station. The specific measurement and reporting process are of the prior art and are not repeated herein.

If the UE is IDLE, the UE resides in the cell. The residing process is also of the prior art and is not be repeated herein.

In step 106, the access process is abandoned.

If the UE determines that it is not allowed to access the current HNB cell, the UE abandons accessing the cell, i.e., the UE does not measure or reside in the cell any longer.

In this embodiment, the UE determines whether the UE is allowed to access the HNB cell before implementing the access processing, and abandons the access if the UE is not allowed. Therefore, it does not need to implement the access processing for all adjacent cells, thereby reducing system burden and enhancing system performance.

In specific, in the embodiment of the present disclosure, the cell access information is obtained. If the adjacent cell is an HNB cell, an IDLE UE determines whether the UE is allowed to access the HNB cell according to the cell access information before accessing the cell and reading the system broadcast message of the cell, and abandons the access if the UE is not allowed. An ACTIVE UE determines whether the adjacent cell is an HNB cell to which the ACTIVE UE is allowed to access before measuring a signal of the adjacent cell, and does not perform the measurement if the ACTIVE UE is not allowed to access the adjacent HNB cell.

According to the method of obtaining the cell access information, the cell access control method in the embodiment of the present disclosure is classified into two types.

In the first type, the cell access information is obtained through a pilot channel and/or a synchronization channel.

Figure 2:
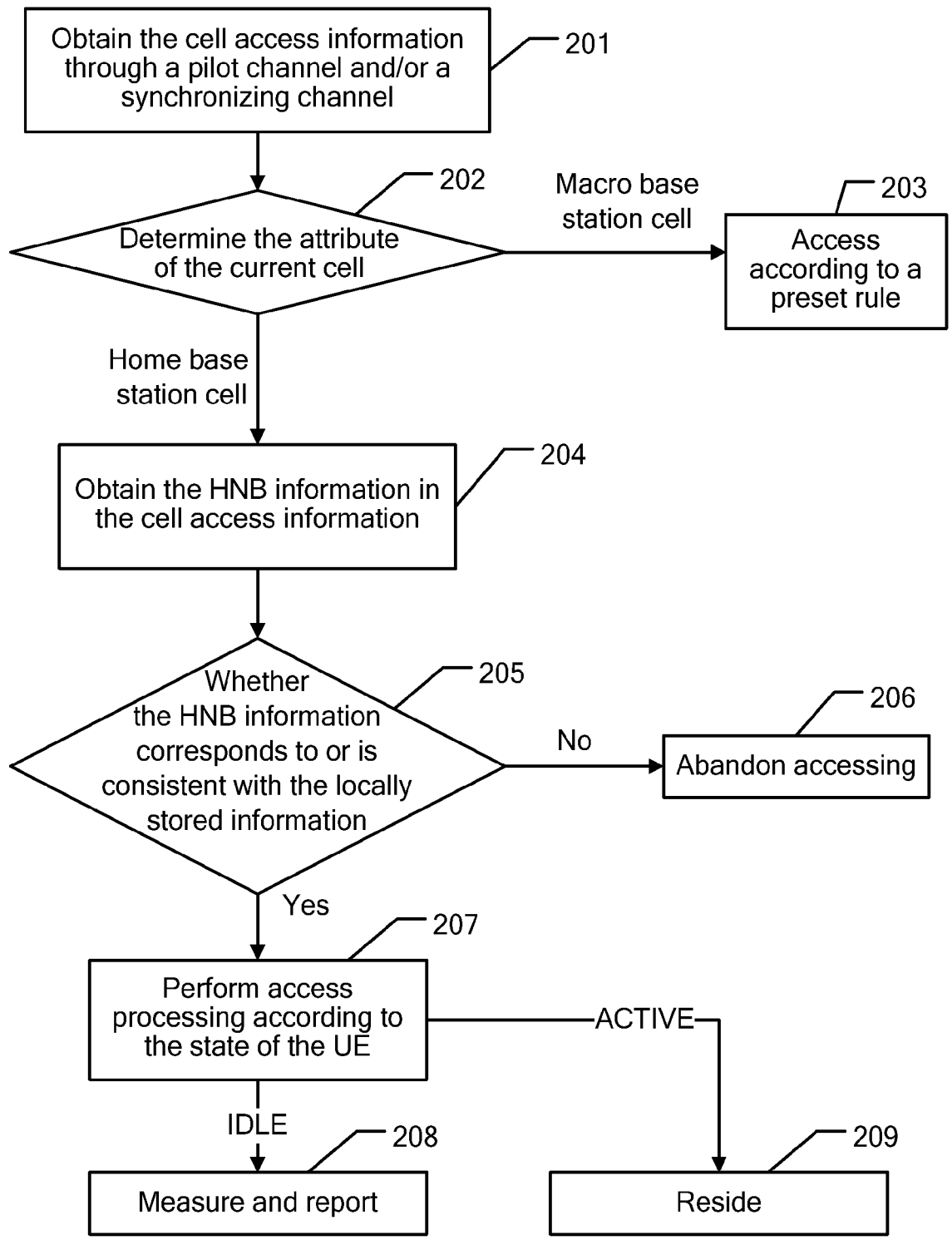
FIG. 2 is a flow chart of a cell access control method according to a first embodiment of the present disclosure.

Referring to FIG. 2, a cell access control method according to a first embodiment of the present disclosure is shown, which includes the following steps.

In step 201, the cell access information is obtained through a pilot channel and/or a synchronization channel.

In this embodiment, the specific method of obtaining the cell access information is classified into the following situations according to application scenarios.

In the first situation, the UE initiates cell selection.

The UE searches a cell, and reads the synchronization channel and/or pilot channel of the searched cell, thereby obtaining the cell access information of the cell.

In the second situation, the UE performs cell reselection.

The UE reads a synchronization channel and/or pilot channel of a cell adjacent to a serving cell, and obtains the cell access information of the adjacent cell through the synchronization channel and/or pilot channel.

In order to read the synchronization channel of the adjacent cell, the UE may need two receivers.

In the third situation, the UE performs handover.

The UE reads a synchronization channel and/or pilot channel of a cell adjacent to a serving cell, and obtains the cell access information of the adjacent cell through the synchronization channel and/or pilot channel.

In step 202, the attribute of the current cell is determined, if it is the macro base station cell, step 203 is performed, and if it is an HNB, step 204 is performed.

The specific method of determination is classified into the following two situations.

In the first situation, determination is performed according to identifier.

The UE determines the attribute of the current cell according to the current cell identifier in the cell access information.

The UE obtains the cell access information from the pilot channel and/or synchronization channel. In this embodiment, the cell access information may consist of two parts, namely, cell ownership identifier and cell symbol information. The cell ownership identifier is used to specify whether the current cell is a macro base station cell or an HNB, and the identifier occupies only one or several bits. The one or several bits may be selected from 9 bits of the cell identifier information (CELL ID) of the current cell, or may be reassigned. For example, one bit is illustrated as follows, but it should be understood that, several bits are also allowable.

For example, it is assumed that the cell ownership information of the macro base station cell is 0, the cell ownership information of the HNB cell is 1, and three cells X, Y, and Z are provided, which are initially marked as 000000001, 000000002, and 000000003. The cell Y is an HNB cell, and the cells X and Z are macro base station cells. Then, after one bit is selected from the CELL ID as the identifier, the cells X and Z are marked as 000000001 and 000000003, and the Y cell is marked as 100000002. Alternatively, after a data bit is reassigned as a mark, the cells X and Z are respectively marked as 0000000001 and 0000000003, and the Y cell is marked as 1000000002.

In the second situation, the determination is performed according to the pilot channel frequency.

When the UE obtains the cell access information from the pilot channel, since the HNB cell and the macro base station cell use different frequency ranges, the pilot channel frequencies received from different types of cells by the UE are in different frequency ranges, and whether the current cell is a macro base station cell or an HNB may be determined according to the frequency range to which the frequency of the pilot channel belongs.

It may be understood that, when the attribute of the current cell is determined according to the frequency of the pilot channel, the ownership identifier, i.e., the macro base station/ HNB property identifier, is unnecessary.

In step 203, the UE accesses according to a preset rule.

If the current cell is a macro base station cell, the UE attempts to access according to the preset accessing rule. The specific rule and accessing method are prior art and are not defined here.

In step 204, the HNB information in the cell access information is obtained.

If the current cell is an HNB, the HNB information is obtained from the cell access information.

In step 205, it is determined whether the HNB information locally stored in the UE corresponds to or is consistent with the read current HNB information. If the HNB information locally stored in the UE corresponds to or is consistent with the read current HNB information, step 207 is performed, and if the HNB information locally stored in the UE does not correspond to or is not consistent with the read current HNB information, step 206 is performed.

The UE may obtain subscription information through registration, other non access stratum (NAS) message, or a subscriber identification module (SIM) card, and stores in the UE locally the information of the HNB that allows to be accessed in the subscription information.

Alternatively, the information of the HNB that allows to be accessed is input to the UE through an input device, thereby storing a list of HNBs that allow to be accessed (including one or more HNBs) in the UE locally. The information of the HNB may be information without HNB CELL ID, or information with HNB CELL ID, or the CELL ID of the HNB may also directly server as the HNB information.

In step 206, the UE abandons accessing.

The UE abandons accessing the cell if the UE determines that the UE is not allowed to access the current HNB cell, that is, does not measure or reside in the cell.

In step 207, the access processing is implemented according to the state of the UE.

In step 208, if the UE is ACTIVE, the cell is measured, and the measurement result is reported to the HNB of the cell. The specific measurement and the reporting process are of the prior art and are not repeated herein.

In step 209, if the UE is IDLE, the UE resides in the cell, and such a process is also of the prior art and is not repeated herein.

The preceding embodiments describe the solution of obtaining the cell access information through the pilot channel and/or synchronization channel. Another solution of obtaining the cell access information will be introduced as follows.

In this solution, the cell access information is obtained through a system broadcast message or a measurement control message.

Figure 3:
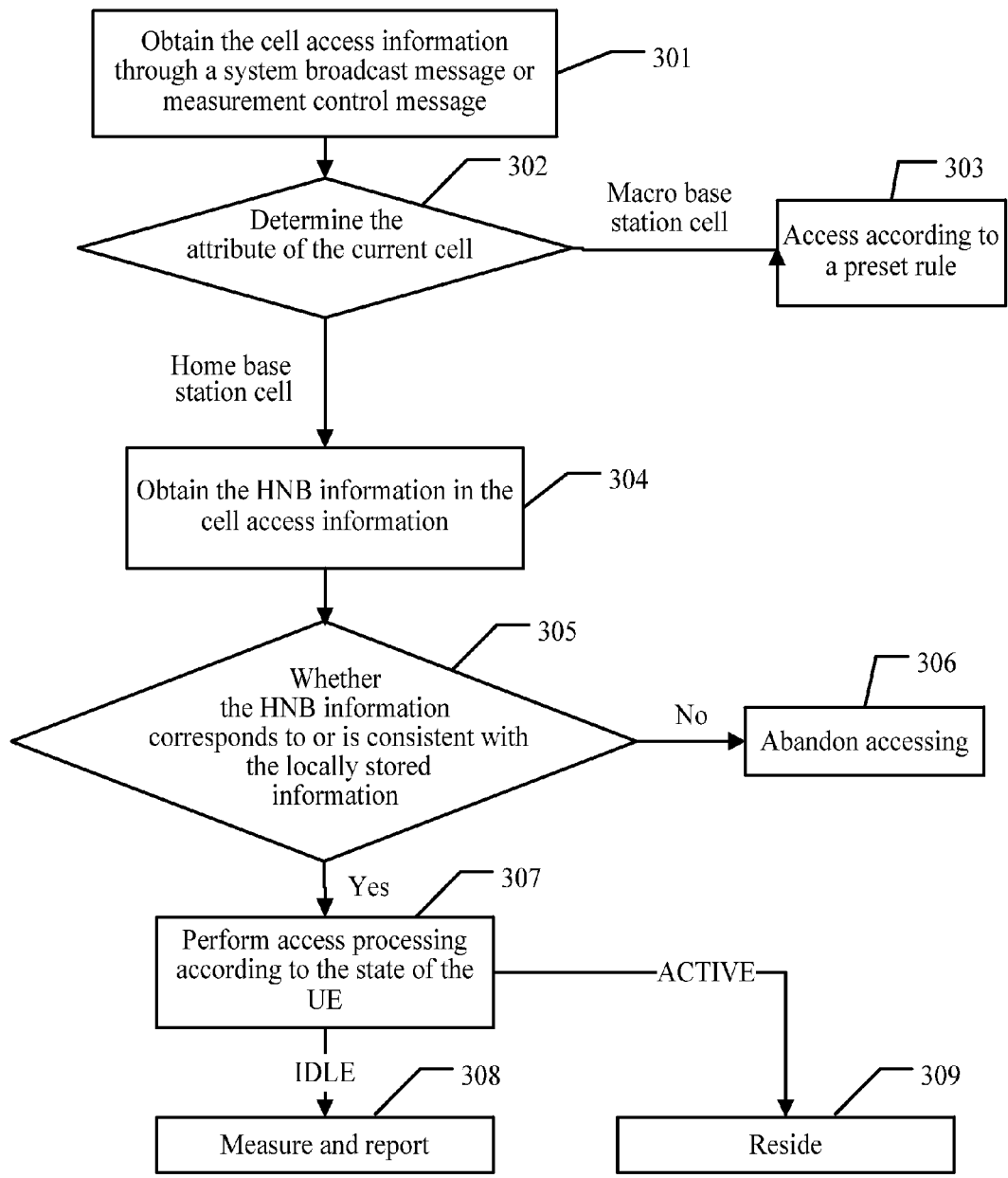
FIG. 3 is a flow chart of a cell access control method according to a second embodiment of the present disclosure.

Referring to FIG. 3, a cell access control method according to a second embodiment of the present disclosure is shown, which includes the following steps.

In step 301, the cell access information is obtained through a system broadcast message or measurement control message.

The UE obtains the cell access information through the system broadcast message or the measurement control message.

The specific method of generating the cell access information will be introduced later.

Furthermore, the specific method of obtaining the cell access information in this embodiment is classified into the following situations according to application scenes.

In the first situation, the UE performs cell reselection.

The UE reads a system broadcast message inside a serving cell, and obtains cell access information of a cell adjacent to the serving cell.

In the second situation, the UE performs handover.

The UE reads a system broadcast message or a measurement control message in a serving cell, and obtains cell access information of a cell adjacent to the serving cell.

In step 302, the attribute of the current adjacent cell is determined, if the current adjacent cell is the macro base station cell, step 303 is performed, and if the current adjacent cell is the HNB cell, step 304 is performed.

The UE determined the attribute of the current adjacent cell according to the current adjacent cell ownership identifier in the cell access information.

In step 303, the UE accesses according to a preset rule.

If the current adjacent cell is a macro base station cell, the UE attempts to access according to the preset accessing rule. The specific rule and accessing method are prior art and are not defined here.

In step 304, the HNB information in the cell access information is obtained.

If the current adjacent cell is HNB, the HNB information is obtained from the cell access information.

In step 305, it is determined that whether the HNB information locally stored in the UE corresponds to or is consistent with the read current HNB information. If the HNB information locally stored in the UE corresponds to or is consistent with the read current HNB information, step 307 is performed, and if the HNB information locally stored in the UE does not correspond to or is not consistent with the read current HNB information, step 306 is performed.

The UE may obtain the subscription information by registration, other NAS message, or an SIM card, and stores in the UE locally the information of the HNB that allows to be accessed in the subscription information.

Alternatively, the HNB information which can be accessed is input to the UE through an input device, thereby storing an HNB list (including one or more HNBs) which can be accessed in the UE locally. Herein, the HNB information may be information without HNB CELL ID, or information with HNB CELL ID, or the CELL ID of the HNB may also directly server as the HNB information.

In step 306, the UE abandons the access processing.

The UE abandons accessing the cell if the UE determines that the UE is not allowed to access the current HNB cell, that is, does not measure or reside in the cell.

In step 307, the access processing is implemented according to the state of the UE.

In step 308, if the UE is ACTIVE, the cell is measured, and the measurement result is reported to the HNB of the cell. The specific measurement and the reporting process are of the prior art and are not repeated herein.

In step 309, if the UE is IDLE, the UE resides in the cell, and such a process is also of the prior art and is not repeated herein.

The method of obtaining the cell information in the embodiments of the present disclosure will be introduced in detail. It may be understood that, the method of obtaining the cell information in the embodiments of the present disclosure is not limited to be adopted in the preceding embodiments.

The CELL ID information of the macro base station evolved NodeB (eNB) is generated in the following process. When the eNB is powered on, an Operations Administration and Maintenance (OAM) or a self-configured server assigns pseudo-scramble information (which is a parameter similar to scramble) associated with the eNB cell for the eNB. Then, the eNB calculates the pilot sequence or scramble necessary for the pilot channel according to the pseudo-scramble information. Likewise, the CELL ID of the synchronization channel is also calculated according to this parameter, and there is a correspondence relationship.

If the preceding base station is HNB, the preceding process is performed, and furthermore, the subsequent operation is performed.

The OAM sends the pseudo-scramble information to the Mobile Management Entity (MME) through some transmission nodes (not limited), or sends the CELL ID to the MME through the HNB. When the UE being allowed to access the HNB registers, initiates services, or updates its position, the UE may obtain the scramble information or the HNB information of the CELL ID, and then a cell reselection or handover is performed by comparing the HNB information of the CELL ID.

Alternatively, the HNB cell information is generated in the following process. When the HNB is powered on, the HNB itself generates pseudo-scramble information according to a preset rule, and calculates the CELL ID information of the HNB cell itself according to the pseudo-scramble information.

The preceding embodiment describes the process of cell access control in the embodiments of the present disclosure, and the corresponding cell access control method may be selected according to specific application situation, thereby enhancing the flexibility of the cell access control method in the embodiments of the present disclosure.

In the above embodiments, the attribute of the current cell is determined first, and if the current cell is the HNB, then it is determined that whether to allow accessing. It may be understood that, the UE may determine directly according to the cell access information, i.e., determine whether the cell access information corresponds to or is consistent with the HNB information locally stored in the UE, and if the cell access information corresponds to or is consistent with the HNB information, the UE implements access processing; if the cell access information does not correspond to or is not consistent with the HNB information, the current cell is determined to be the macro base station cell or the HNB according to the cell access information. If the current cell is the macro base station cell, access processing is performed according to the preset rule and the specific accessing method is of the prior art and is not repeated herein. If the current cell is the HNB, the access processing is abandoned.

The specific steps of determining whether the current cell is the macro base station cell or the HNB cell according to the cell access information are consistent with the preceding steps in the above embodiments, and are not repeated again.

Figure 4:
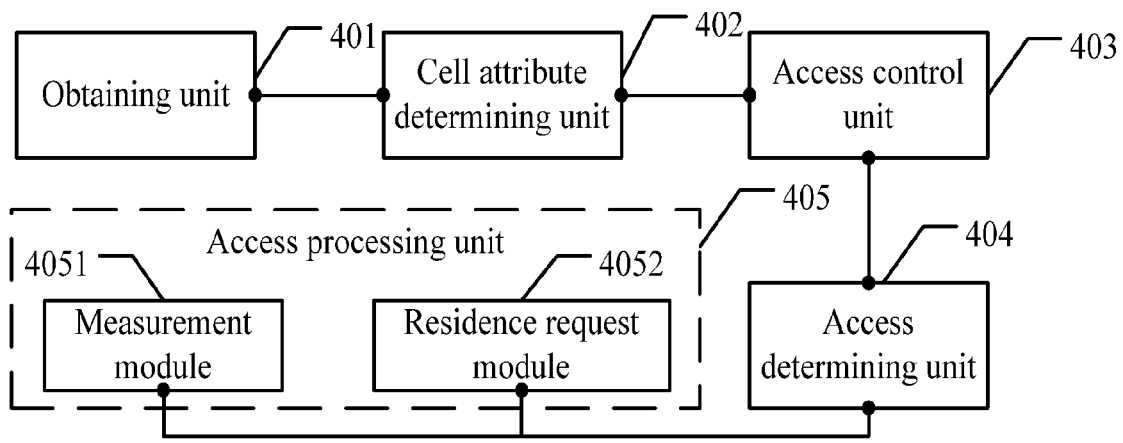
FIG. 4 is a schematic view of a UE according to an embodiment of the present disclosure.

The UE according to an embodiment of the present disclosure is introduced as follows. Referring to FIG. 4, the embodiment of the UE according to the present disclosure includes an obtaining unit 401, a cell attribute determining unit 402, an access control unit 403, and access determining unit 404, and an access processing unit 405.

The obtaining unit 401 is adapted to obtain the cell access information through a pilot channel and/or synchronization channel.

The cell attribute determining unit 402 is adapted to determine whether the current cell is a macro base station cell or an HNB cell according to the cell access information.

The access control unit 403 is adapted to access the macro base station cell according to a preset access rule when the current cell is a macro base station cell.

The access determining unit 404 is adapted to determine whether the HNB cell allows to be accessed according to the cell access information.

The access processing unit 405 is adapted to perform the access processing when the current HNB cell allows to be accessed.

The access processing unit 405 includes a measurement module 4051 and/or a residence request module 4052.

The measurement module 4051 is adapted to measure the HNB cell when the UE is active, and report the measurement result to the HNB.

The residence request module 4052 is adapted to send a residence request to the HNB when the UE is idle.

Figure 5:
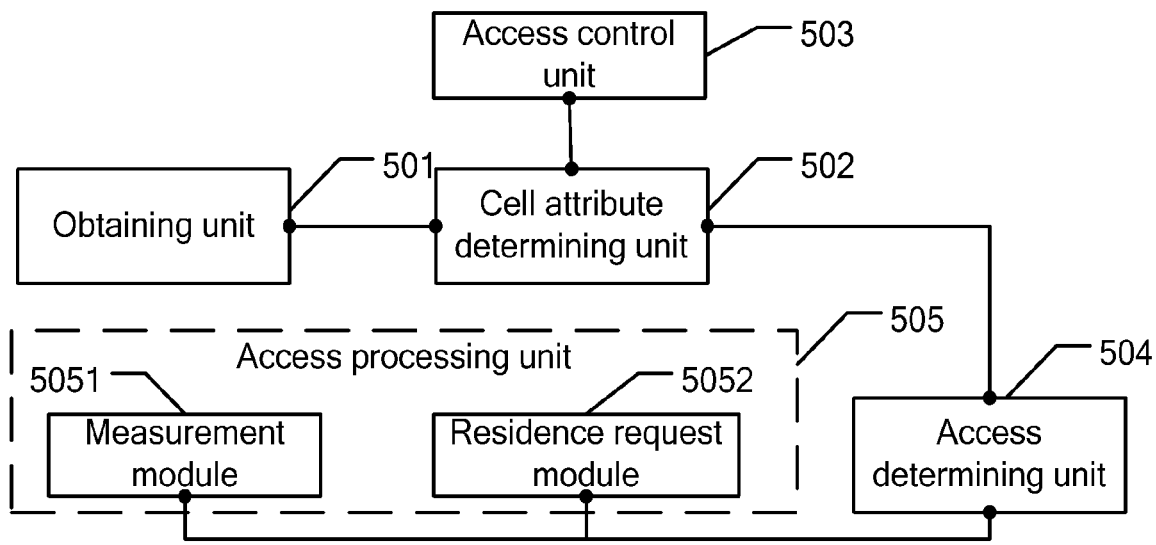
FIG. 5 is a schematic view of another UE according to an embodiment of the present disclosure.

Referring to FIG. 5, a UE is further provided according to an embodiment of the present disclosure, which includes an obtaining unit 501, a cell attribute determining unit 502, an access determining unit 504, and an access processing unit 505.

The obtaining unit 501 is adapted to obtain the cell access information.

The cell attribute determining unit 502 is adapted to inform the access determining unit 504 when the current cell is determined as the HNB cell according to the cell access information.

The access determining unit 504 is adapted to determine whether the UE is allowed to access the HNB cell according to the HNB information of the cell access information, and inform the access processing unit 505 of the determining result.

The access processing unit 505 is adapted to perform the access processing when it is determined that the current HNB cell allows to be accessed; and abandon the access when it is determined that the current HNB cell allows to be accessed.

The access processing unit 505 includes a measurement module 5051 and/or a residence request module 5052.

The measurement module 5051 is adapted to measure the HNB cell when the UE is active, and report the measurement result to the HNB.

The residence request module 5052 is adapted to initiate a residence request to the HNB when the UE is idle.

The UE in FIG. 5 further includes an access control unit 503.

The cell attribute determining unit 502 is further adapted to inform the access control unit 503 when the current cell is determined as the macro base station cell according to the cell access information;

The access control unit 503 is adapted to access the current macro base station cell according to the preset accessing rule.

Figure 6:
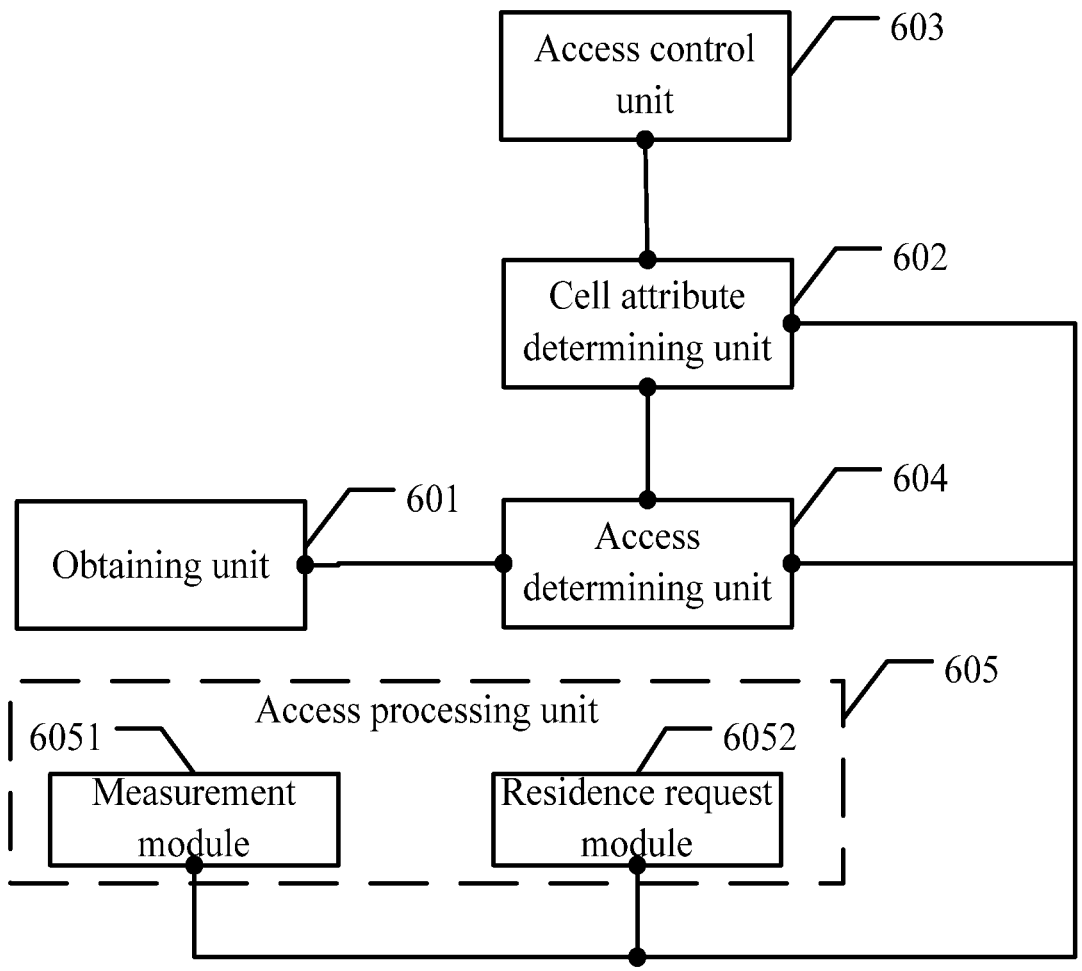
FIG. 6 is a schematic view of still another UE according to an embodiment of the present disclosure.

Referring to FIG. 6, a UE is further provided according to an embodiment of the present disclosure, which includes an obtaining unit 601, an access determining unit 604, and an access processing unit 605.

The obtaining unit 601 is adapted to obtain the cell access information.

The access determining unit 604 is adapted to inform the access processing unit 605 when it is determined that the cell access information corresponds to or is consistent with the HNB information locally stored in the UE.

The access processing unit 605 is adapted to perform the access processing.

The UE in FIG. 6 further includes a cell attribute determining unit 602 and an access control unit 603.

The access determining unit 604 is further adapted to inform the cell attribute determining unit 602 when it is judged that the cell access information is not corresponding to or consistent with the HNB information locally stored in the UE.

The cell attribute determining unit 602 is adapted to determine whether the current cell is a macro base station cell or an HNB cell according to the cell access information, if the current cell is the HNB cell, inform the access processing unit 605 to abandon the access and if the current cell is the macro base station cell, inform the access control unit 603.

The access control unit 603 is adapted to access the current macro base station cell according to the preset accessing rule when accessing the current macro base station cell.

The access processing unit 605 includes a measurement module 6051 and/or a residence request module 6052.

The measurement module 6051 is adapted to measure the HNB cell when the UE is active, and report the measurement result to the HNB.

The residence request module 6052 is adapted to send a residence request to the HNB when the UE is idle.

Those of ordinary skill in the art may understand that, all or a part of steps in the methods in the preceding embodiments may be implemented by instructing relevant hardware using a program, and the program may be stored in a computer readable storage medium. The program in execution includes the following steps. The UE obtains cell access information through a pilot channel and/or a synchronization channel, i.e., CELL ID and/or frequency range; determines whether the current cell is a macro base station cell or an HNB cell according to the cell access information; if the current cell is an HNB cell, determines whether it is allowed to access the HNB cell according to the HNB information of the cell access information, and if it is allowed, the UE performs the access processing; otherwise, the UE abandons the accessing.

The preceding storage medium may be a read-only memory, a magnetic disc, or an optical disc.

It should be noted that, the cell information and the cell access information in the specification mean the same, and the cell access information may include CELL ID and/or frequency ranges.

The cell access control method and the UE provided in the present disclosure are introduced in detail as above. Those of ordinary skill in the art may change the specific implementation and application ranges according to the concept in the embodiments of the present disclosure. In view of the above, the contents of the specification cannot be interpreted to limit the present invention.

What is claimed is:

1. A cell access control method, comprising:
   sending, by a home eNodeB (HNB), cell access information to a user equipment (UE) through a synchronization channel; and
   implementing, by the HNB, an access processing of the UE, the access processing is initiated by the UE after the UE is determined to be allowed to access a HNB cell by comparing the cell access information sent through the synchronization channel with HNB information stored in UE memory, wherein the determination of the UE is allowed to access the HNB cell is performed after a cell is determined as the HNB cell according to the cell access information sent through the synchronization channel.

2. The method of claim 1, wherein the cell access information comprises: cell identifier information.

3. The method of claim 1, the method further comprises:
   generating, by the HNB, pseudo-scramble information according to a preset rule; and
   calculating, by the HNB, the cell access information according to the pseudo-scramble information.

4. The method of claim 1, wherein the HNB information includes an HNB list, and the HNB list includes at least one HNB that allows the UE to be accessed.

5. A home eNodeB (HNB), comprising:
   a transmitter, configured to send cell access information to a user equipment (UE) through a synchronization channel; and
   a processor, configured to implement an access processing of the UE, the access processing is initiated by the UE after the UE is determined to be allowed to access a HNB cell by comparing the cell access information sent through the synchronization channel with HNB information stored in UE memory, wherein the determination of the UE is allowed to access the HNB cell is performed after a cell is determined as the HNB cell according to the cell access information sent through the synchronization channel.

6. The HNB of claim 5, wherein the cell access information comprises: cell identifier information.

7. The HNB of claim 5, wherein the processor further configured to generate pseudo-scramble information according to a preset rule, and calculate the cell access information according to the pseudo-scramble information.

8. The HNB of claim 5, wherein the HNB information includes an HNB list, and the HNB list includes at least one HNB that allows the UE to be accessed.

* * * * *